Figure 1:
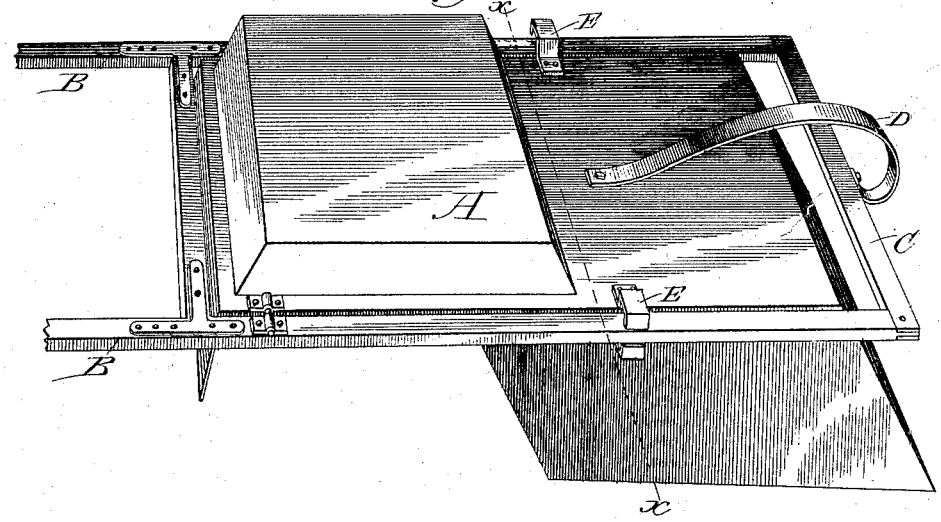

(No Model.)

A. A. ABBOTT.
TWO WHEELED VEHICLE.

No. 324,794. Patented Aug. 25, 1885.

Witnesses,
L. T. Mann,
Frederick R. Goodwin

Inventor,
Arthur A. Abbott
By Offield & Towle
Att'ys.

UNITED STATES PATENT OFFICE.

ARTHUR A. ABBOTT, OF CHICAGO, ILLINOIS.

TWO-WHEELED VEHICLE.

SPECIFICATION forming part of Letters Patent No. 324,794, dated August 25, 1885.

Application filed August 14, 1884. (No model.)

*To all whom it may concern:*

Be it known that I, ARTHUR A. ABBOTT, of the city of Chicago, county of Cook, and State of Illinois, have invented a new and useful Improvement in Two-Wheeled Vehicles; and I hereby declare the following to be a full, clear, and exact description thereof.

My invention relates to that class of two-wheeled vehicles with pivoted shafts upon the body of the vehicle and a spring-connection between such shafts and the body, so as to neutralize or destroy the jerking or horse motion incident to this class of vehicles. The manner in which this object is accomplished will be seen from the particular description hereinafter made.

I am aware that various spring-connections have been interposed beween the pivoted shafts and the body of the vehicles to overcome the above-named difficulty. This has been attempted in various ways by connecting each shaft upon the side of the vehicle with the body by means of one or more springs in connection with each shaft. This method has the disadvantage of requiring two springs of equal tension, and aside from the expense thereof this manner of connection is uncertain in its action in all conditions of travel. I obviate these difficulties by extending the shafts to the rear of the body of the vehicle and connecting them together rigidly by a cross-bar. At or near the center of this cross-bar I place a spring of any suitable size or shape to accomplish the purpose, fastening one end of such spring to the cross-bar and the other to the body of the vehicle. This spring has superior advantages in this mode of connection, for the reason that it can be made of thicker and stronger material, less likely to break, is at a point where easily attached, presenting a more sightly appearance than any device heretofore used, and in all respects being more cheap, durable, and effective than any practical spring device now known. Suitable stops are placed, as shown in the drawings, upon the side of the vehicle to regulate the play of the shafts in extreme condition of travel. These stops may also be made of sufficient distance apart to interpose springs, upon which the shafts may impinge or bear to lessen or completely destroy any sudden jerking motion in travel.

Figure 2:
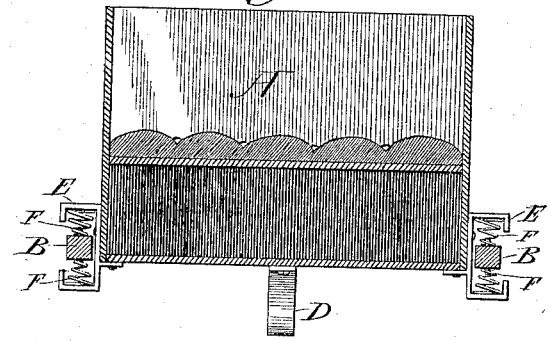
Figure 3:
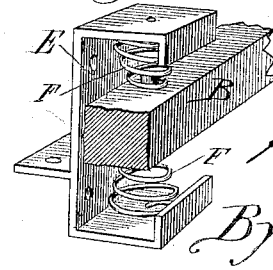

In the accompanying drawings, Figure 1 is a perspective view of the under side of a two-wheeled vehicle embodying my invention. Fig. 2 is a cross-section view through the lines *x x*. Fig. 3 is a detailed view of the shaft-stop device with the impinging springs.

A represents the body of the vehicle, which of course is mounted upon two wheels, and may be of any suitable size and construction; B, the shafts, which are pivotally secured to the body of the vehicle, preferably at or near its forward end; C, the cross-bar connecting the shafts at the rear of the body; D, the spring connecting this cross-bar with the body of the vehicle; E, the stops. *f f f f* are the small springs arranged upon such stops to assist in regulating the play of the shafts under a sudden movement or heavy weight.

It is not absolutely essential to my invention that the cross-bar connecting the shafts should be immediately in the rear of the body of the vehicle, as it even may be arranged forward of the body and connected by my spring device; but, preferably, the cross-bar should be placed as shown in the drawings.

I do not desire to confine myself to the exact mode of construction shown, as several devices may be made without materially altering my invention.

Having now fully described my invention, what I claim as new, and desire to secure by Letters Patent, is—

1. In a two-wheeled vehicle, the combination, with the shafts united by a cross-bar and pivoted to the body of the vehicle, of a single spring-connection with the body of the vehicle, one end of said spring being secured to the cross-bar at or near its center, and the other end to the body, substantially as shown and described.

2. In a two-wheeled vehicle, the combination of the body A, pivoted shafts B, cross-bar C, and spring D, connecting said cross-bar with the body A of the vehicle, substantially as shown and described.

3. In a two-wheeled vehicle, the combination of the body A, shafts B, cross-bar C, spring D, connecting said cross-bar with the said body, and stops E, substantially as shown and described.

4. In a two-wheeled vehicle, the combination of the body A, pivoted shafts B, cross-bar C, spring D, stops E, and small springs F, substantially as shown and described.

ARTHUR A. ABBOTT.

Witnesses:
FREDERICK C. GOODWIN,
E. L. HUBER.